United States Patent [19]

Shingu et al.

[11] 4,033,610

[45] July 5, 1977

[54] ELECTRICAL IGNITION CIRCUIT FOR GAS GENERATOR

[75] Inventors: Iichi Shingu; Yutaka Kondo; Shuho Nishina, all of Aichi, Japan

[73] Assignee: Toyota Jidosha Kogyo Kabushiki Kaisha, Japan

[22] Filed: May 19, 1975

[21] Appl. No.: 578,866

[30] Foreign Application Priority Data

Sept. 19, 1974 Japan .............. 49-107936

[52] U.S. Cl. .................. 280/737; 102/37.7; 102/70.2 R; 102/82; 280/742; 361/248; 333/29

[51] Int. Cl.² .................. B60R 21/08

[58] Field of Search .......... 317/80, 36 TD; 333/29; 102/37.7, 82, 70.2 R; 280/734, 735, 736, 737, 742

[56] References Cited

UNITED STATES PATENTS

| | | | |
|---|---|---|---|
| 3,225,695 | 12/1965 | Kapp | 317/80 X |
| 3,518,487 | 6/1970 | Tanaka | 317/80 |
| 3,635,647 | 1/1972 | Kim | 317/80 X |
| 3,758,131 | 9/1973 | Stephenson | 280/150 AB |
| 3,767,002 | 10/1973 | Gillund | 280/150 AB |
| 3,786,843 | 1/1974 | Stephenson | 280/150 AB X |
| 3,861,710 | 1/1975 | Okubo | 280/150 AB |
| 3,944,249 | 3/1976 | Smith | 102/37.7 X |
| Re. 28,164 | 9/1974 | Stephenson | 280/150 AB X |

Primary Examiner—John P. Silverstrim
Attorney, Agent, or Firm—Stevens, Davis, Miller & Mosher

[57] ABSTRACT

An electrically activated ignition circuit system for a gas generator to be used to inflate a gas bag in a motor vehicle. The system includes a bridge circuit including a first ignition filament for igniting gas-producing substances disposed in a gas generating bomb and a second ignition filament for exploding a detonator to break a seal for the bomb; a source to supply current to the bridge circuit; and a collision sensor to couple the current from the source to the bridge circuit when a collision occurs. The current first heats the second filament to explode the detonator and then heats the first filament to ignite the gas-producing substances.

11 Claims, 10 Drawing Figures

ELECTRICAL IGNITION CIRCUIT FOR GAS GENERATOR

BACKGROUND OF THE INVENTION

The present invention relates to an electrically-actuated ignition circuit or system which acts fast in traffic accidents such as crashes or the like to actuate a gas generator for producing a volume of high-pressure gas to be filled in a separate gas bag for inflation so as to safe-guard a driver against sudden impacts or shocks due to the crashes or sudden stops.

When a driver, who is riding in a motor vehicle such as an automobile car at high speeds, happens to encounter a traffic accident such as a crash, he will receive a considerable amount of sudden shock or impact which may place him in an extremely dangerous condition.

There is a safety-equipment device known as a gas bag apparatus which is to be actuated immediately in emergencies to inflate a gas bag designed to safeguard the driver against such sudden shock or impact. The known apparatus is constructed such that it is actuated either when a motor vehicle is shocked by impacts of over a given limit or by means of a radar sensor which predicts a given level of a possible near crash so that a gas bag installed in a driver's seat may be inflated so fast as to hold the driver to his seat. This keeps the driver's body restrained in such emergencies, thereby safeguarding the driver against the impact or shock. It is known that the apparatus acts fast to feed a volume of high-pressure gas to a gas bag for inflation.

There are also known different types of sources for supplying the high-pressure gas. One is a gas bomb or vessel in which is filled a volume of compressed gas. However, this type of gas supply has disadvantages since a bomb or vessel must be large enough to contain a large volume of gas under highly compressed pressure. This is because it is ordinarily difficult or impossible to obtain a desired volume of gas from the bomb as the temperature of the gas is drastically reduced by the action of adiabatic expansion.

There is another supply of high-pressure gas known as a hybrid-type gas generator. This hybrid-type gas generator is so called because it is a combination of high-pressure gas and chemical substances for generating high-temperature gas when burned. The gas generator includes gas producing substances and an electrically-heated filament for burning the substances, and is separately installed in a high-pressure gas filled bomb. When the filament is energized upon a shock or impact, it ignites the substances for burning to produce high-temperature gases. This provides a dual effect since it produces a volume of high-temperature gas and increases the volume of the high-pressure gas in the bomb by adding the high-temperature gas thereto. Therefore, it can finally supply a sufficient volume of high-pressure gas. By using the gas generator, it is possible to construct a gas bomb of a relatively small size.

As explained above, the hybrid-type gas generator includes an electrically-heated filament for burning the gas-producing substances, but actually needs another electrically heated filament for exploding a detonator to break a seal provided in a bomb for supplying the produced gas to a separate gas bag. According to this conventional type bomb, the two filaments act at the same time when a shock or impact is sensed, so that the bomb is made to lead gas to the gas bag just as the gaseous products are generated. This may present no particular problem as long as the gas generator functions properly. However, it has problems with respect to the safety operation when trouble occurs, since there is provided no control function by which operational priorities are given to any one of the two filaments. Practically, it may conceivably happen that the detonator-explosion filament will act intolerably later than the other filament. In such a situation, the bomb would have an explosively increased internal pressure which might possibly lead to either exploding the bomb or breaking the seal in the bomb. In the latter case, the gas bag would be inflated so fast that it might seriously injure the driver.

SUMMARY OF THE INVENTION

It is one object, among other objects, of the present invention to provide an improved safety-equipment device for a driver who is riding his car at high speeds.

It is another object of the present invention to provide an electrical ignition circuit or system for actuating a gas generator to produce high-pressure gases by burning gas producing substances contained therein, in which there is provided a bridge circuit consisting of a filament which is electrically heated to burn the gas producing substances and one or more filaments which are electrically heated to explode detonators for breaking a seal in a gas bomb, and which is constructed such that it first energizes one of the filaments for breaking the seal and then the other for starting the burning of the gas producing substances.

Other objects and advantages of the present invention will be apparent from the specification and appended claims that follow by reference to the accompanying drawings.

DESCRIPTION OF THE PREFERRED EMBODIMENTS

The present invention will further be described by way of several preferred embodiments by referring to the accompanying drawings.

Figure 1:
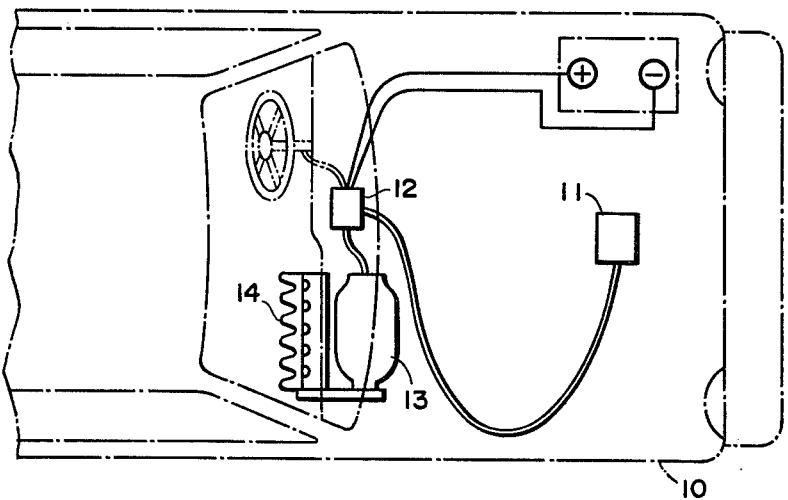
FIG. 1 is a schematic diagram of a gas bag apparatus installed in an automobile car.

Referring first to FIG. 1, there is given a schematic diagram of a gas bag as installed in an automobile car. A shock detector or collision sensor 11 is provided at the front of a car body 10, and sends its detect signals to a control unit 12 which in turn sends its control signals to a number of safety devices installed in the car. The control unit 12 also sends its control signals to a hybrid-type gas generator 13 which acts upon receipt of the signals to produce high-pressure gas for inflating a gas bag 14 provided at a driver's seat.

Figure 2:
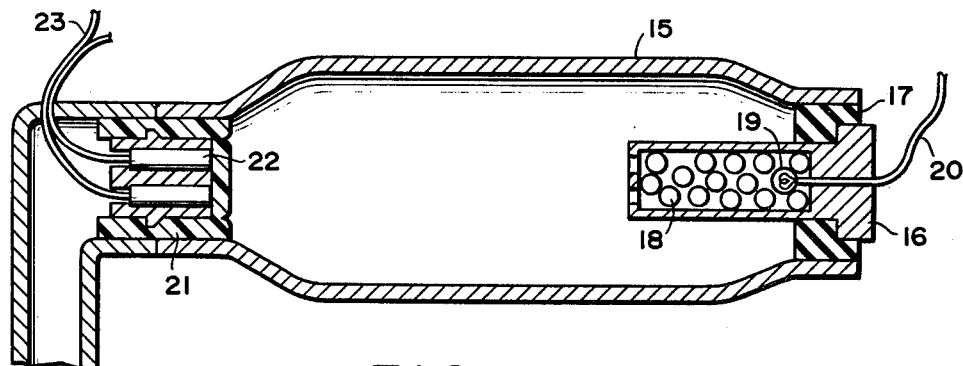
FIG. 2 is a sectional view of a gas generator in which its detailed construction is shown.

FIG. 2 shows the internal construction of the gas generator 13 provided in the form of a high-pressure gas bomb or container 15, at one end of which an enclosure 16 is provided for enclosing gas-producing substances 18 therein. The enclosure 16 also has a filament 19 therein which is electrically heated to burn the gas-producing substances 18. The filament 19 is connected by means of a lead wire 20 to an electrical ignition circuit provided in the control unit 12.

The bomb 15 has an opening at the other end thereof which is normally closed by a seal (or airtight closure) 21 which keeps the bomb 15 airtight. The seal 21 has one or more filaments 22 at the inner wall thereof which are electrically heated to explode detonators or explosives for breaking the seal 21 and are connected by way of a lead wire 23 to the electrical ignition circuit above referred to.

Figure 3:
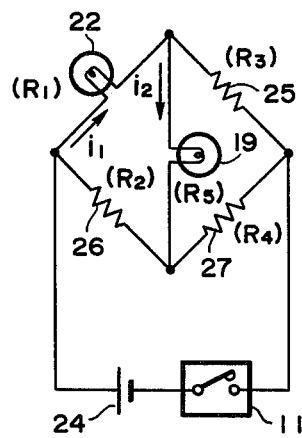
FIGS. 3 through 10 show various preferred embodiments of the electrical ignition circuit according to the present invention.

FIG. 3 indicates a first preferred embodiment of the ignition circuit provided according to the present invention, which includes the two different filaments 19, 22 and other circuit elements. In FIG. 3, the collision sensor 11 is provided in series with a power supply battery 24, from which current flows to the filaments 19, 22. The collision sensor 11 includes an accelerator switch or decelerator switch and the like which is normally placed in an "OFF" position. As the detector 11 senses a shock or impact of over a given limit on the car, it turns the switch to an "ON" position, keeping it on for a given period of time or longer.

A bridge circuit is provided in series with the battery 24 and the detector 11 to form a closed loop circuit, and consists of two parallel branches formed by four arms having the filament 22, a balancing resistor 25 and proportional resistors 26, 27, respectively, and one arm or bridging conductor linking the junction between one pair and the other and having the filament 19. The bridge circuit is such that all resistors should have a value to balance the bridge. In this manner, when the detector 11 senses a given level of shock or impact and turns on the switch, current from the battery 24 will flow to the filament 22 but will not flow to the filament 19. As a given amount of current flows to the filament 22, the filament 22 is then heated to explode its explosive for breaking the seal 21. When the seal 21 is broken, it communicates the bomb 15 with the gas bag 14. At the very moment the explosive is exploded, the filament 22 is physically or electrically cut; this unbalances the bridge, so that current flows to the filament 19. As the filament 19 is thus energized or rendered conductive, it is then heated to begin burning the gas-producing substances 18. The gaseous products such as nitrogen gas thus obtained are supplied to the gas bag for inflation.

It can easily be understood from the foregoing that the circuit according to the invention is actuated to break the seal 21 first, and then produce high-pressure gas. In order to ensure that the two filaments 19, 22 act correctly or at a timing interval as desired, it is necessary to provide the individual resistors of the bridge which have a ratio of a suitable value.

Assume now that E is the voltage of the battery 24, R1 and R5 are the values of the filaments 22 and 19, respectively, R2, R3 and R4 are the values of the resistors 26, 25 and 27, respectively, and 1A and 1B are the maximum non-ignition current and minimum ignition current of the filaments 19 and 22; assume then that the filament 22 carries a current i1 and the filament 19 carries a current i2, the currents i1 and i2 being supplied from the common battery 24 when the detector 11 senses a given level of shock or impact on the car, then a slight amount of current flows to the filament 19 with the bridge in the unbalanced condition. Even with the unbalanced condition in the bridge, the gas generator can work effectively if the following current condition is satisfied:

$$i1 = \frac{E}{\Delta}(R2 \cdot R3 + R2 \cdot R4 + R2 \cdot R5 + R4 \cdot R5) > 1B$$

$$i2 = \frac{E}{\Delta}(R2 \cdot R3 - R1 \cdot R4) < 1A,$$

provided that $$\Delta = \begin{vmatrix} (R2 + R4) & -R2 & -R5 \\ -R2 & (R1 + R2 + R5) & -R5 \\ -R4 & -R5 & (R3 + R4 + R5) \end{vmatrix}$$

Under the above condition, the filament 22 carries a current of a value or strength enough to heat the filament 22 whereas the value of a current flowing to the filament 19 is not great enough to heat the filament 19. As the filament 22 is thus energized, it is heated to explode its detonator so that the seal 21 is destroyed with the accompanying breakage of the filament 22, which as a result changes the value or strength of the current i2 flowing to the filament 19.

If the current i2 has a value to satisfy the following equation, the filament 19 will be heated to burn the gas producing substances 18 for producing the gaseous products:

$$i2 = \frac{E(R3 + R4 + R5)}{R2(R3 + R4 + R5) + R4(R3 + R5)} \cdot \frac{R4}{R3 + R4 + R5} > 1B$$

By suitable choice of the individual resistances of the bridge to satisfy the three equations mentioned above, it is possible to ensure that the filament 22 is first heated to destroy the seal 21 and the filament 19 is then heated to produce a volume of high-pressure gas.

The bridge circuit which has been described with reference to FIG. 3 includes a battery as a power supply. It may include a capacitor or condenser connecting with a charging circuit instead of a battery, as practically it serves for a very short time.

Figure 4:
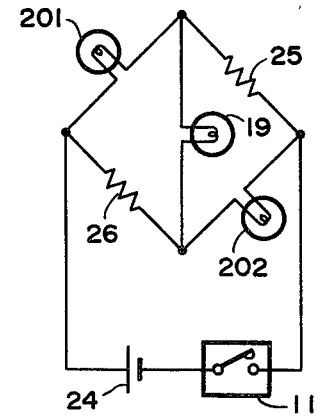

There are various modifications of the ignition circuit provided in accordance with the present invention, which are shown hereinafter. In FIG. 4, there is provided a second preferred embodiment of the invention, in which the circuit arrangement is substantially similar to that of FIG. 3. The circuit elements except a few are therefore the same. The difference of the second embodiment can be characterized by the use of two filaments 201 and 202 opposite each other in the bridge for exploding their respective detonators. This arrangement assures that even if either one of the two filaments fails or is damaged, the circuit functions satisfactory with the other filament.

Figure 5:
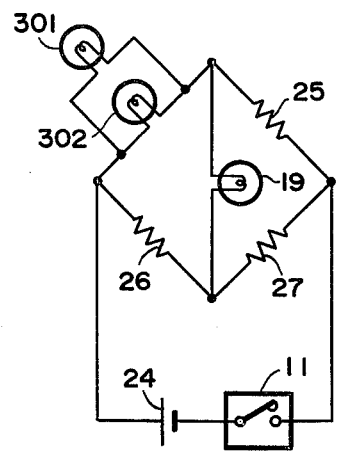

FIG. 5 indicates a third preferred embodiment in which two filaments 301 and 302 are provided for breaking the seal 21 as in FIG. 4, but are arranged in parallel with each other in one arm of the bridge.

Figure 6:
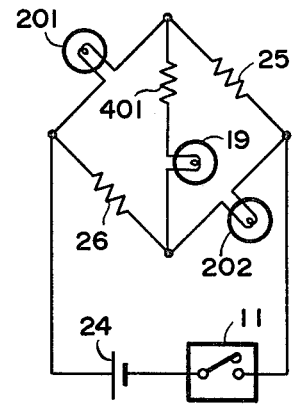

FIG. 6 indicates a fourth preferred embodiment in which the circuit arrangement is substantially similar to that of FIG. 4 except that there is added a current-reducing resistor 401 in series with the filament 19. The resistor 401 has a function of reducing the intensity of a current to be introduced into the filament 19 while a current flows to the filaments 201 and 202. This function enables the individual resistances of the bridge to have a greater deviation within the allowable limits of the resistances.

Figure 7:
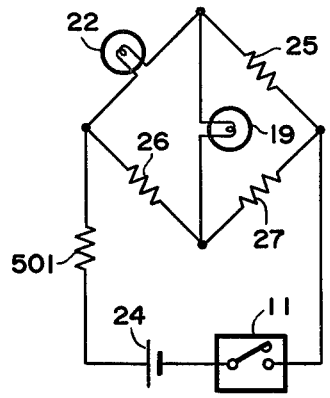

FIG. 7 indicates a fifth preferred embodiment in which a current-reducing resistor 501 is provided between the bridge circuit and the battery 24.

Figure 8:
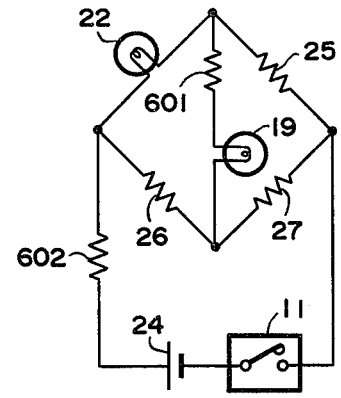

FIG. 8 indicates a sixth preferred embodiment in which current-reducing resistors 601 and 602 are provided, one resistor 601 being connected in series with the filament 19 and the other 602 being provided between the bridge circuit and the battery 24.

Figure 9:
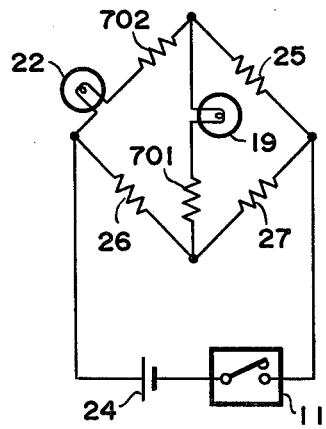

FIG. 9 indicates a seventh preferred embodiment in which a current-reducing resistor 701 is provided in series with the filament 19 with an adjustable resistor 702 connected in series with the filament 22. The adjustable resistor 702 is used to balance the bridge when the filaments 19 and 22 of a different resistance are employed.

Figure 10:
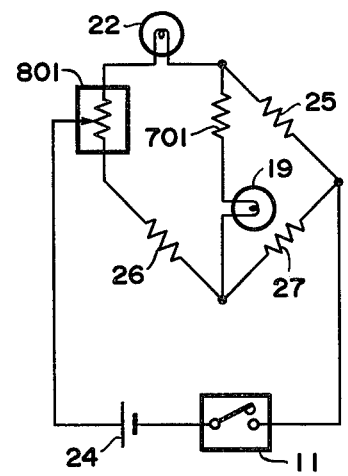

FIG. 10 indicates an eighth preferred embodiment which is most suitable for balancing the bridge. In FIG. 10, there is provided a variable resistor 801 at the junction between the battery 24 and the bridge circuit. The balance of the bridge can therefore be attained by adjusting the value of the resistor 801. Once the bridge is balanced, the resistor 801 is fixed in its resistance by suitable means.

As can easily be understood from the foregoing specification in which varying modifications of the invention have been shown, the ignition circuit according to the present invention has various advantages since it can be actuated for first breaking the seal in the bomb to allow passage of the gas which is to be produced thereafter. This can eliminate the risk of exploding the bomb, and therefore can properly control the rate at which the gas bag is inflated.

While the invention has been described in conjunction with the preferred embodiments thereof, it is to be understood that numerous modifications and changes may be made without departing from the spirit and scope of the invention.

We claim:

1. An electrically-activated ignition circuit system for a gas generator for inflating a gas bag in a motor vehicle, said gas generator including a high pressure gas bomb having a first ignition filament for exploding a detonator to break a seal therein and an enclosure containing gas-producing substances having a second ignition filament for burning said gas-producing substances, comprising:
   a collision sensor,
   a voltage source connected in series with said collision sensor to form a series circuit, and
   a bridge circuit having first, second, third and fourth arms, the junction of said first and second arms being connected to one end of said series circuit and the junction of said third and fourth arms being connected to the other end of said series circuit, the first arm of said bridge circuit comprising said first ignition filament, said second and third arms being resistors, and said second ignition filament being connected between the junction of said first and third arms and the junction of said second and fourth arms, the resistive values of said arms and said first and second ignition filaments being such that, upon actuation of said collision sensor, the current through said first ignition filament exceeds a first value required to explode said detonator and destroy said first ignition filament and the current through said second ignition filament is less than a second value required to effectively heat said second ignition filament, destruction of said first ignition filament causing the current through said second ignition filament to immediately increase above said first value thereby being heated sufficiently to burn said gas-producing substances.

2. An electrically-activated ignition circuit system as defined by claim 1 wherein the current through said first ignition filament is:

$$\frac{E}{\Delta}(R2 \cdot R3 + R2 \cdot R4 + R2 \cdot R5 + R4 \cdot R5)$$

where,
E is the magnitude of the voltage provided by said voltage source, $$\Delta = \begin{vmatrix} (R2 + R4) & -R2 & -R5 \\ -R2 & (R1 + R2 + R5) & -R5 \\ -R4 & -R5 & (R3 + R4 + R5) \end{vmatrix}$$

R2, R3 and R4 are the resistive values of the second, third and fourth arms of said bridge circuit, and
R1 and R5 are the resistive values of said first and second ignition filaments, and wherein the current through said second ignition filament is $$\frac{E}{\Delta}(R2 \cdot R3 - R1 \cdot R4)$$

prior to destruction of said first ignition filament and $$\frac{E(R3 + R4 + R5)}{R2(R3 + R4 + R5) + R4(R3 + R5)} \cdot \frac{R4}{R3 + R4 + R5}$$

after destruction of said first ignition filament.

3. An electrically-activated ignition circuit system as defined by claim 1 wherein the fourth arm of said bridge circuit comprises a resistor.

4. An electrically-activated ignition circuit system as defined in claim 3 wherein a third ignition filament is connected in parallel with said first ignition filament.

5. An electrically-activated ignition circuit system as defined in claim 3 wherein a resistor is connected in series with said second ignition filament.

6. An electrically-activated ignition circuit system as defined by claim 3 wherein a resistor is connected in series with said series circuit.

7. An electrically-activated ignition circuit system as defined in claim 6 wherein a resistor is connected in series with said second ignition filament.

8. An electrically-activated ignition circuit system as defined by claim 1 wherein the fourth arm of said bridge circuit comprises a third ignition filament.

9. An electrically-activated ignition circuit system as defined in claim 8 wherein a resistor is connected in series with said second ignition filament.

10. An electrically-activated ignition circuit system as defined in claim 1 wherein a variable tapped resistor is interposed between said first ignition filament and the second arm of said bridge, the tap on said variable resistor being coupled to said one end of said series circuit.

11. An electrically-activated ignition circuit system as defined in claim 10 wherein a resistor is connected in series with said second ignition filament.

* * * * *